(12) United States Patent
Cetinturk

(10) Patent No.: US 10,475,443 B2
(45) Date of Patent: *Nov. 12, 2019

(54) RELATIVE EXCITATION FEATURES FOR SPEECH RECOGNITION

(71) Applicant: Cetin Cetinturk, Ankara (TR)

(72) Inventor: Cetin Cetinturk, Ankara (TR)

(*) Notice: Subject to any disclaimer, the term of this patent is extended or adjusted under 35 U.S.C. 154(b) by 0 days.

This patent is subject to a terminal disclaimer.

(21) Appl. No.: 15/924,169

(22) Filed: Mar. 16, 2018

(65) Prior Publication Data

US 2018/0277101 A1    Sep. 27, 2018

Related U.S. Application Data

(63) Continuation of application No. 14/782,799, filed as application No. PCT/TR2014/000035 on Feb. 17, 2014, now Pat. No. 9,953,635.

(30) Foreign Application Priority Data

Apr. 11, 2013    (TR) .................................. 201304371

(51) Int. Cl.
*G10L 15/06*    (2013.01)
*G10L 15/02*    (2006.01)
(Continued)

(52) U.S. Cl.
CPC ............ *G10L 15/063* (2013.01); *G10L 15/02* (2013.01); *G10L 25/12* (2013.01); *G10L 25/18* (2013.01);
(Continued)

(58) Field of Classification Search
USPC ................. 704/236–239, 246, 247, 251, 252
See application file for complete search history.

(56) References Cited

U.S. PATENT DOCUMENTS 5,918,223 A    6/1999  Blum et al.
7,117,145 B1   10/2006 Venkatesh et al.
(Continued)

FOREIGN PATENT DOCUMENTS

WO    WO2014168591 A1    10/2014

OTHER PUBLICATIONS

Restriction Requirement dated Dec. 12, 2016, U.S. Appl. No. 14/782,799, filed Oct. 7, 2015.
(Continued)

*Primary Examiner* — Leonard Saint Cyr

(57) ABSTRACT

Relative Excitation Features, in all conditions, are far superior to conventional acoustic features like Mel-Frequency Cepstrum (MFC) and Perceptual Linear Prediction (PLP), and provide much more speaker-independence, channel-independence, and noise-immunity.

Relative Excitation features are radically different than conventional acoustic features. Relative Excitation method doesn't try to model the speech-production or vocal tract shape, doesn't try to do deconvolution, and doesn't utilize LP (Linear Prediction) and Cepstrum techniques. This new feature set is completely related to human hearing. The present invention is inspired by the fact that human auditory perception analyzes and tracks the relations between spectral frequency component amplitudes and the "Relative Excitation" name implies relative excitation levels of human auditory neurons.

Described herein is a major breakthrough for explaining and simulating the human auditory perception and its robustness.

31 Claims, 10 Drawing Sheets

(51) Int. Cl.
*G10L 25/18* (2013.01)
*G10L 25/12* (2013.01)
*G10L 25/24* (2013.01)
*G10L 25/84* (2013.01)

(52) U.S. Cl.
CPC .............. *G10L 25/24* (2013.01); *G10L 25/84* (2013.01); *G10L 2015/0631* (2013.01)

(56) References Cited

U.S. PATENT DOCUMENTS

| | | | |
|---|---|---|---|
| 7,171,003 | B1 | 1/2007 | Venkatesh et al. |
| 9,953,635 | B2 | 4/2018 | Cetinturk |
| 2003/0204394 | A1 | 10/2003 | Garudadri et al. |
| 2005/0182624 | A1 | 8/2005 | Wu et al. |
| 2008/0162122 | A1 | 7/2008 | Rose et al. |
| 2009/0115635 | A1 | 5/2009 | Berger et al. |
| 2009/0299741 | A1 | 12/2009 | Chittar et al. |
| 2013/0179158 | A1 | 7/2013 | Nakamura et al. |
| 2013/0202120 | A1 | 8/2013 | Bickel et al. |
| 2013/0226957 | A1 | 8/2013 | Ellis et al. |
| 2014/0180673 | A1 | 6/2014 | Neuhauser et al. |
| 2014/0180674 | A1 | 6/2014 | Neuhauser et al. |
| 2014/0180675 | A1 | 6/2014 | Neuhauser et al. |

OTHER PUBLICATIONS

Office Action dated Mar. 14, 2017, U.S. Appl. No. 14/782,799, filed Oct. 7, 2015.
Final Office Action dated Aug. 17, 2017, U.S. Appl. No. 14/782,799, filed Oct. 7, 2015.
Notice of Allowance dated Dec. 4, 2017, U.S. Appl. No. 14/782,799, filed Oct. 7, 2015.
Foreign Communication from a Related Counterpart—International Search Report and Written Opinion, dated Sep. 23, 2014, PCT/TR2014/000035, filed on Feb. 17, 2014.
Foreign Communication from a Related Counterpart—International Preliminary Report on Patentability, dated Oct. 11, 2015, PCT/TR2014/000035, filed on Feb. 17, 2014.
Liu, M., et al., "Content-based audio classification and retrieval using a fuzzy logic system: towards multimedia search engines," Aug. 1, 2002, pp. 357-364, vol. 6, No. 5, pp. 357-364.

Clean
23.4%
Error Reduction

☐ MFCC

☒ RELATIVE
  EXCITATION
  COEFS.

Noisy
41%
Error Reduction

☐ MFCC

☒ RELATIVE
  EXCITATION
  COEFS.

Noisy
44%
Error Reduction

☐ MFCC

☒ RELATIVE
  EXCITATION
  COEFS.

similar

RELATIVE EXCITATION FEATURES FOR SPEECH RECOGNITION

CROSS REFERENCE TO RELATED APPLICATIONS

This application is a continuation of and claims priority to U.S. application Ser. No. 14/782,799, filed on Oct. 7, 2015 and entitled, "Relative Excitation Features for Speech Recognition" which is a National Stage Filing under 35 U.S.C. 371 of PCT/TR2014/000035 filed in the Turkish Patent and Trademark Office on Feb. 17, 2014, which claims priority to Turkish patent application 2013/04371 filed in the Turkish Patent Office Apr. 11, 2013, each of which are incorporated herein by reference in its entirety.

DESCRIPTION

This invention is related to acoustic feature extraction for speech recognition and other audio processing applications.

Acoustic feature extraction has critical importance for speech recognition accuracy. But existing techniques are sub-optimal, not immune to noise, and too sensitive to channel or speaker variation.

Today almost all of the parametric representations of speech depend on Cepstrum or LP (Linear Prediction) techniques. The most commonly used acoustic feature representation is MFCC (Mel-Frequency Cepstral Coefficients). Another common acoustic feature representation is PLP (Perceptual Linear Prediction). PLP was proposed by Hynek Hermansky "Perceptual linear predictive (PLP) analysis of speech," 1990. MFC and PLP methods both produce cepstral coefficients.

Through more than 30 years, thousands of research studies have been conducted to find out a better parametric representation of speech. Some variations of Cepstrum techniques have emerged, like Minimum Variance Distortionless Response MFCC (MVDR-MFCC), Gammatone Cepstral Coefficients (GTCC), Power-Normalized Cepstral coefficients (PNCC), Zero-Crossings with Peak Amplitude (ZCPA), Perceptual harmonic cepstral coefficients (PNCC), etc. All of these methods depend on Cepstral representation of speech. Most of them provide some accuracy improvement over standard MFC method for noisy conditions, but there is no or negligible improvement for clean speech compared to standard MFC method. A better parametric representation of the acoustic signal is needed.

The present invention discloses a novel and radically different method for producing superior acoustic features over PLP, MFC and other similar features. We named this revolutionary new method as "Relative Excitation", considering the fact that human auditory perception analyzes and tracks the relations between spectral frequency component amplitudes. The "Relative Excitation" name is produced from an analogy based on relations between spectral frequency component amplitudes or relative excitation levels of auditory nerve in human cochlea.

Generally speaking, human perception is relative, and it is sensitive to the differences. For example, we can easily sense a weak light source in darkness. Darkness provides a low stimulation to neurons on the retina and the light source causes relatively high simulation, so we can easily sense a weak light source in the darkness, but we may not notice or sense the same light source in the day light. A similar stimulation model is true for human auditory. We know the tone masking properties of hearing very well. The tone masking features of human audition forms an important evidence for the relative perception of human hearing with a tonotopic mapping. Relative Excitation coefficients excellently simulate the tonotopic and relative perception of human auditory sense.

Relative Excitation features are radically different than PLP and MFC features. Relative Excitation method doesn't try to model the speech-production or vocal tract shape, or doesn't try to do deconvolution and doesn't use linear prediction or cepstral representation in contrast to PLP and MFCC. This new feature set is completely related to human hearing. Trying to model the speech production system or trying to do deconvolution is not an optimal approach for speech recognition, because there are endless combinations of articulatory organs' positions and movements. Moreover, the effect of environment and channel increase the complexity of the system that is to be modeled.

PLP and MFC or other cepstrum based methods have negative properties like strong channel-dependence and speaker-dependence or too much sensitivity to noise. Generally, for these methods, a small change in the system causes significant unwanted changes of the calculated coefficients (Please see FIGS. 6a and 6b). For example, the cosine transformation used for calculating the cepstral coefficients causes some portion of noise to affect all of the coefficients. Different channels (microphones, electronics, compression techniques, etc.) have different frequency responses. Noise and channel frequency response variations have too much negative influence on the coefficients of these methods. Utilizing these conventional methods as an acoustic front end for speech recognition systems;

increases training and recognition data mismatch,
increases the amount of acoustic data needed for healthy training,
increases the variance of trained models, resulting with coarse models.

As an attempt to mimic human auditory system, PLP, MFC or other conventional methods use some techniques like time-domain pre-emphasis, weighting according to the equal-loudness contour over the frequency spectrum, computing the log-magnitude or cubic root representation of the spectral amplitudes, and other spectral weighting or normalization techniques. We see these techniques as a struggle to heal the problematic nature of cepstrum for speech recognition.

Advantageous Effects of the Invention

Relative Excitation coefficients are superior over MFC and PLP coefficients at all conditions. Relative Excitation coefficients provide up to 25% relative error reduction compared to MFCC or PLP for clean speech. Error reduction can reach up to 60% at noisy conditions.

Relative Excitation coefficients have very strong noise-immunity, channel-independence, and speaker-independence properties compared to MFC and PLP.

Although the Relative Excitation method is superior, it requires much less computation for estimating acoustic features compared to MFCC and PLP. There is no need for pre-emphasis, equal-loudness weighting, log-amplitude, linear prediction, or DCT (Discrete Cosine Transform) of the cepstrum technique.

Relative Excitation coefficients are completely compatible with cepstrum feature vectors for statistical processing such as distance measurement, mean and variance normalization, LDA, PCA, MLLR, fMLLR, etc. So Relative Excitation coefficients can easily replace cepstral coefficients.

Just like Cepstrum, Relative Excitation Method uses a predetermined uniform feature extraction structure which is not dependent on the signal, and produces coefficients that can represent any audible signal including human speech.

Relative Excitation coefficients reduce training data and recognition data mismatch. It is possible to train much more healthy Hidden Markov Models with much less variance.

Relative Excitation coefficients excellently simulate the physical limits of basilar membrane, human hearing range and sensitivity.

There is a trend towards training LVCSR (Large Vocabulary Continuous Speech Recognition) systems on a large amount of found data. Found data is recorded from spontaneous speech without control of the acoustic conditions, so found data normally contains multiple acoustic conditions, such as environmental noise or spectral deformation caused by the variation of the channel frequency response. If noisy speech is used for training, cepstral coefficients deteriorate acoustic models. In contrast to cepstral coefficients, some degree of noise seems to be beneficial for the acoustic models trained with Relative Excitation coefficients. This property of Relative Excitation coefficients makes Relative Excitation method excellent for using large amount of found data to train the acoustic models of a speech recognition system. Training LVCSR systems with found spontaneous speech data is very important to get the speech recognition technology closer to the human recognition performance.

Many attempts have made been by scientists to exploit the parametric formant representation in speech recognition applications, because utilizing formant information in speech recognition may provide substantial benefits like robustness against additive noise. But, it is not possible to represent all speech sounds, such as nasals and fricatives in terms of formant frequencies, and additionally, existing formant estimation algorithms are not reliable enough to be used in a speech recognition system. Unreliable and inconsistent parameter values are not suitable for speech recognition, since algorithms are designed to deal with consistent feature vectors of a fixed length that bear the same measurement information in each element. Until now, there hasn't been a satisfying solution for incorporating formant information in speech recognition. Relative excitation coefficients are suitable for any signal type and bear the formant information, if exists, without any inconsistency at the feature vector. Relative Excitation method is designed to capture the amplitude differences of spectral regions, the spectral valleys, peaks or formants. When a Relative Excitation coefficient represents the relation between two spectral components, one of which is located close to a formant frequency, the coefficient's value depends on the relative amplitude of the formant.

In addition to all these benefits, the present invention introduces a very strong novel noise handling technique that resembles the spectral focusing and ignorance capability of human hearing.

Relative Excitation method opens a door to a new realm that has endless possibilities and it is a major breakthrough for understanding and simulating human auditory perception.

BRIEF DESCRIPTION OF DRAWINGS

FIGS. 6*a*-6*d* compare MFC and Relative Excitation coefficients for noise-immunity. Please notice that all of the MFC coefficients have large deviation in contrast to Relative Excitation coeffs. Deviations of the last four Relative Excitation coefficients (11-12-13-14) are high and this is normal and very useful. Please read the noise-immunity section for more information on these graphics.

FIGS. 7*a*-7*c* show the result of the accuracy tests conducted to compare Relative Excitation and MFC coefficients. All tests are conducted on a speaker-independent English speech recognition system having a 300K sized vocabulary, 220M Trigrams, 14K HMM states and 8 mixtures with diagonal covariances for each state. MFC and Relative Excitation acoustic models are trained with the same audio corpus having 180K utterances. Training and test utterances are found-speech-utterances and may have mild or non-disturbing level of noise. There are more than 6000 different speakers in training corpus and 320 different speakers in test set. Embodiment 1 is used for computing Relative Excitation coefficients in these tests.

FIGS. 10a-10b show Relative Excitation envelope of a clean frame and its noisy version computed by Embodiment 2. FIGS. 10a and 10b have a close relation with FIGS. 6a, 6b, 6c, and 6d and show the effect of noise for the embodiment 2. Please notice that FIG. 10a and FIG. 10b have almost the same values in the region that is below 3.3 khz where the signal is dominant, and different values for the noise-dominant region that corresponds the last 4 coefficients of embodiment 1 explained in FIGS. 6c and 6d. Please read the noise-immunity section for more information on these graphics.

FIGS. 11a and 11b show channel-independence of Relative Excitation method. Embodiment 2 is used for estimating Relative Excitation envelopes. Please note that Eq3 is used in Embodiment 2 for a better visualization since Eq1 inverts the peaks. Relative Excitation coefficients are scaled 400 times.

RELATIVE EXCITATION FEATURE EXTRACTION METHOD

Figure 1:
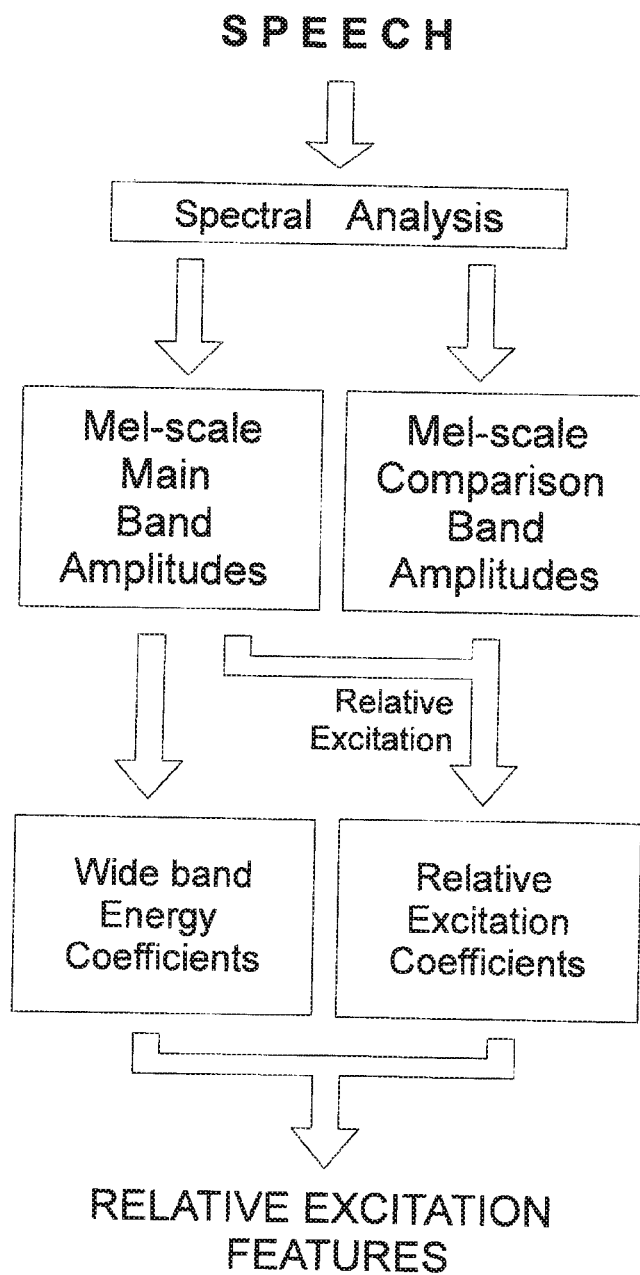
FIG. 1 shows Relative Excitation feature extraction method.
Figure 2:
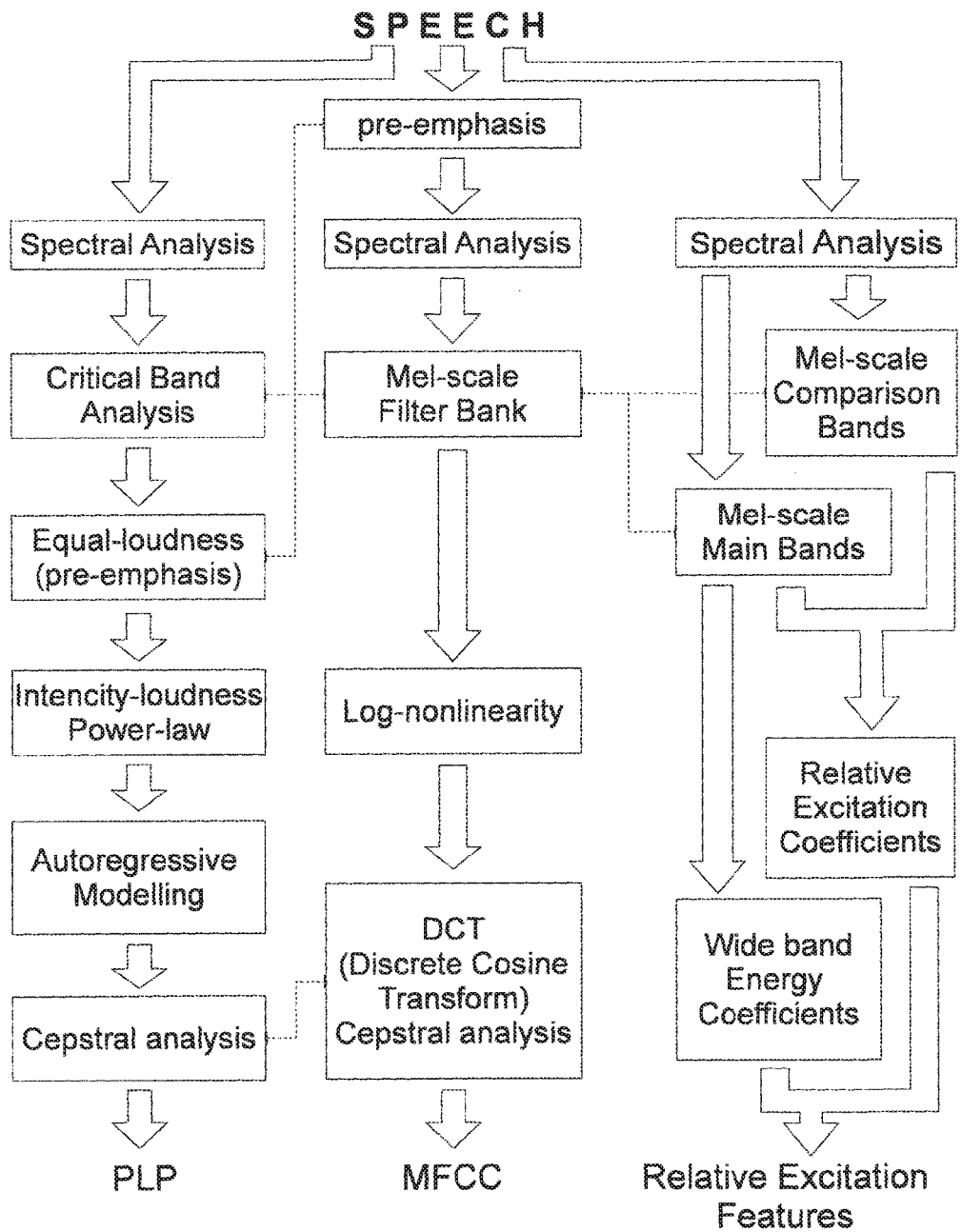
FIG. 2 compares PLP, MFC and Relative Excitation methods.
Figure 3:
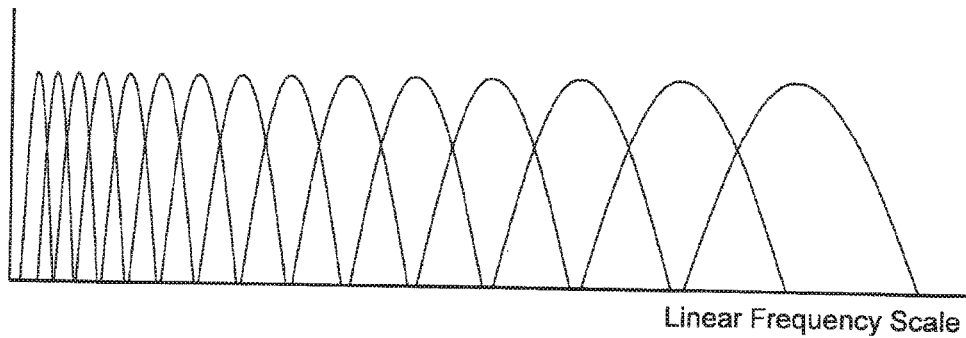
FIG. 3 shows sinusoidal filters of main bands of Relative Excitation method.
Figure 4:
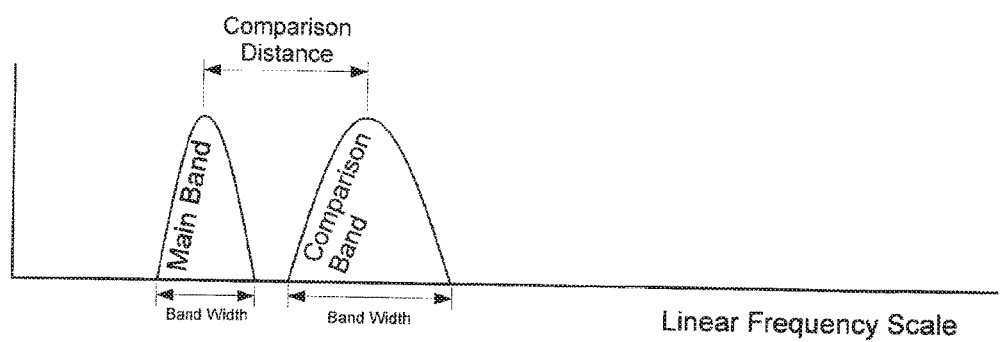
FIG. 4 shows sinusoidal filters of a main band and its comparison band.

Digital audio data of an utterance is divided into frames, then following 5 steps are repeated for each frame.
1—Estimate the short term amplitude spectrum.
2—Compute amplitudes of main components.
3—Compute amplitudes of comparison components.
4—Compute relative excitation coefficients.
5—Compute wide-band energy coefficients.

Delta and delta-delta (acceleration) coefficients are added to feature vectors upon completion of required frames. Mean and variance normalization is applied for the utterance.

The main and comparison components are spectral components. These spectral components can be bandpass filters of a filter bank, frequency bands or bins of a frequency transform function like FFT, or points of a spectral envelope.

The Relative Excitation method is explained via frequency bands for achieving simplicity in the explanation. Embodiment 1 shows an implementation of the Relative Excitation method that utilizes frequency bands. Embodiment 2 is an example where bin amplitudes are used instead of band amplitudes for computing Relative Excitation coefficients. When shorter spectral components are used as in Embodiment 2, the comparison results are integrated to form meaningful coefficients.

Please note that there is no step for pre-emphasis or equal-loudness contour weighting in contrast to MFCC and PLP, because Relative Excitation method compensates the amplitude attenuation of spectral regions or provides regional gain-invariance for the comparisons that are made between spectral components of the same region. Moreover, no amplitude non-linearity function (like log-compression or root cube) is required for estimating Relative Excitation coefficients in contrast to Cepstrum or PLP.

Relative Excitation coefficients can represent any region of the spectrum or the whole spectrum without any dependency on the signal or the spectral composition. Relative Excitation method has the ability to utilize a predetermined uniform comparison structure which depicts the compared spectral component positions. Moreover Relative Excitation Method incorporates the formant information among coefficients without actually searching the formants. There is no need for dynamically selecting the spectral component positions or compared components according to formant positions, pitch frequency, harmonic positions, spectral peaks or similar properties of the acoustic signal. Currently, existing methods for formant frequency, pitch frequency and harmonic position estimation are not reliable. Even if there were a reliable solution, having a dynamic feature extraction structure which depends on the signal is a heavy handicap to form consistent feature vectors. As a result, the ability to utilize a predetermined uniform comparison structure;
  makes the Relative Excitation method simple and reliable,
  makes the Relative Excitation method usable for any audible signal including human speech,
  makes the Relative Excitation coefficients usable for speech recognition, since consistent measurements that form a consistent feature vector become possible. In other words, Relative Excitation feature vectors can be utilized for training and recognition, because the same elements of different feature vectors bear comparable information originating from the same measurement.

Figure 11A:
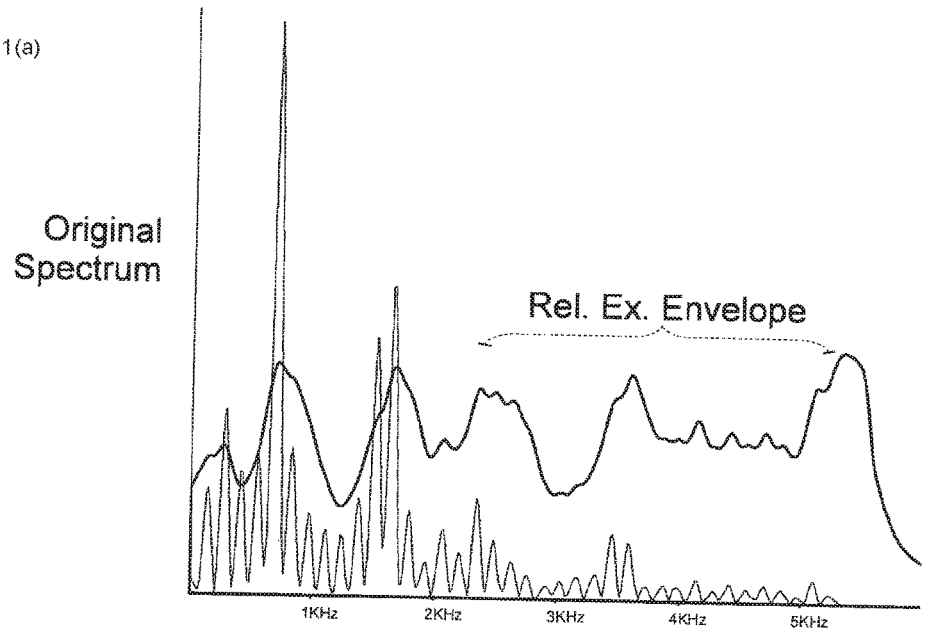
FIG. 11a shows the Relative Excitation envelope of a vowel frame. To understand how relative excitation method incorporates formant information in coefficients, please notice the formants of the spectrum and their corresponding representation on the envelope curve. The elements of a Relative Excitation feature vector can be seen as sampled points of a curve as in this figure.

Please check FIG. 11a to see how formant and spectral peak information is incorporated in Relative Excitation coefficients.

Computing the Amplitudes of Main Bands

The amplitude spectrum is warped according to the Mel-scale or a similar logarithmic scale in order to adapt the frequency resolution to the properties of the human cochlea.

Generally, 13-16 main bands are used for speech recognition. To provide more detail, the number of the main bands can be increased if memory and processing load is not a matter.

Main bands should be distributed evenly on the Mel-scale. But it is possible to increase the intensity of coefficients for some regions of the spectrum, in contrast to MFCC and PLP.

The basilar membrane within the cochlea disperses incoming sound waves to separate frequencies spatially. Since the basilar membrane is a physical structure, vibrations affect a region rather than just one small point. The strongest vibration and stimulation occur at the resonance point. As the distance from the resonance point on basilar membrane increases the strength of vibration decreases. This feature of cochlea is modeled with some different filter shapes depending on the application.

Triangular filters of MFC, the critical band curves of PLP or gammatone filters can be utilized, preferably with an increased bandwidth for better performance.

We conducted our tests with sinusoidal filters, just because of their simplicity and some ability to simulate the dispersion of vibrations on the basilar membrane.

Figure 12:
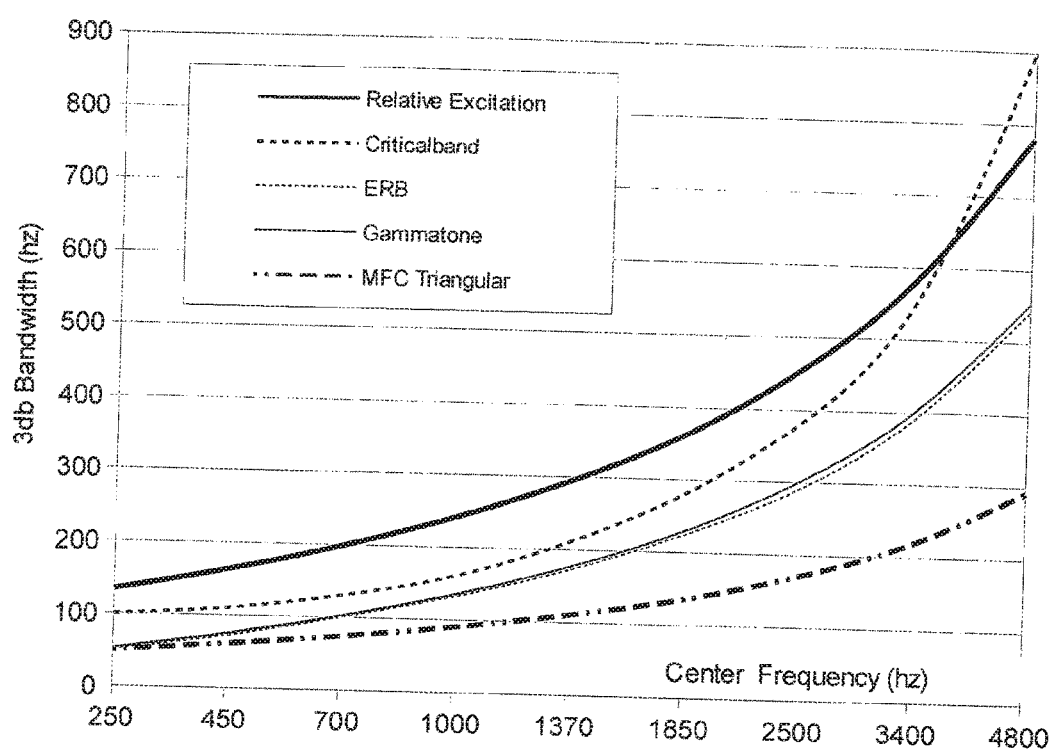
FIG. 12 shows bandwidths of different filters. Surprisingly, relative excitation method uses much wider filters compared to other sound processing methods. Optimum 3 dB bandwidth of Relative Excitation filters are about 160 Mels.

The width of the main bands has a critical importance and depends on the shape of the filter function. Basically the 3 dB bandwidth of the frequency bands or bandpass filters must range between 120 to 240 Mels on the Mel-frequency scale or equivalent range on another scale. 3 dB bandwidth is the bandwidth measured at half-power points or the points where the gain is −3 dB, or 0.707 relative to peak. Decreasing the bandwidth increases the negative effects of harmonics, and increasing the bandwidth decreases the resolution. Our experiments show that the optimum 3 db bandwidth of main bands is approximately 160 Mels. Surprisingly, Relative excitation method uses much wider filters compared to other sound processing methods. Please see the FIG. 12.

The width of the sinusoidal filters for main bands should range between 240 to 440 units on the Mel-frequency Scale (the bandwidth measured at zero points of the sinusoidal filter frequency response). We mentioned this bandwidth to provide simplicity in understanding the Embodiment 1.

To estimate the main band amplitudes, amplitude of each frequency bin of a band is weighted with the corresponding filter coefficient, then the sum of the weighted amplitudes are normalized with the sum of the filter coefficients.

Computing the Amplitudes of Comparison Bands

There must be one or more comparison bands for each main band. So, the number of comparison bands are equal to the number of main bands or can be more if more than one comparison will be made for a main band. Separately computing comparison band amplitudes is not obligatory, to save some processing power, other main bands can be used as the comparison bands of a main band.

The distance of a comparison band from its main band on the frequency scale has critical importance. Our experiments show that the comparison of two frequency bands that are separated with a distance ranging from 40 to 800 units on the Mel-Frequency Scale provides usable coefficients.

Having a comparison band with a distance less than 40 Mels actually means trying to compare the same spectral component or vibration, so the comparison becomes useless.

Having a large comparison distance (for example larger than 800 Mels) suffers from the increased effects of channel frequency response variation and regional attenuation of spectral components that make comparison results unstable. Moreover, it causes to compare low frequency speech components with the high frequency speech components that generally don't exist together, so the comparison becomes useless. In other words, when you increase the comparison distance too much there is an increased possibility of comparing spectral speech components with the noise, because vowels or consonants have spectral energies concentrated on definite regions of the spectrum. These issues form some major problems for the cepstrum method, because the DCT transform of the cepstrum method makes the whole spectrum affect all coefficients. Since there is no way to overcome these problems in the cepstrum method, scientists have conducted thousands of research studies to find a solution or some compensation in the frequency domain before calculating cepstral coefficients. In contrast to cepstrum, Relative Excitation method gives strong control on these issues.

Just like the main bands, the width of the comparison bands has a critical importance and depends on the shape of the filter function. Basically, the 3-db bandwidth of the comparison bands must range between 120 to 240 Mels. Our experiments show that the optimum 3-db comparison bandwidth is approximately 180 Mels.

The width of the sinusoidal filters for comparison bands should range between 240 to 440 units on the Mel-frequency Scale (the bandwidth measured between zero points of the sinusoidal filter frequency response, or the bandwidth of non-zero coefficients). Again, we mentioned this bandwidth to provide simplicity for understanding the Embodiment 1.

To estimate a comparison band amplitude, amplitude of each frequency bin of a band is weighted with the corresponding filter coefficient, then the sum of the weighted amplitudes are normalized with the sum of the filter coefficients.

Please note that no non-linearity function (like log-compression or root cube) is utilized.

Computing Relative Excitation Coefficients

Main band and comparison bands simulate different neuron groups on the tonotopic mapping or basilar membrane. The name "Relative Excitation" implies the relative amplitude of a main band with regards to its comparison band or relative excitation level of a neuron group with regards to its comparison neuron group. Mathematically, Relative Excitation coefficients are the quantitative measures of the relationship between amplitudes of two spectral components that are being compared.

Direct amplitude ratios of main and comparison bands or difference of logarithmic amplitudes could be used as the comparator function. But, these approaches are vulnerable to noise and not stable enough. We propose two new comparator functions:

$$Cre = 0.5 - (Amb/(Amb+Acb)) \quad (Eq1)$$

$$Cre = (Amb - Acb)/(Amb+Acb) \quad (Eq2)$$

Cre=Relative Excitation Coefficient
Amb=Main band amplitude
Acb=Comparison band amplitude Please note that amplitudes are in the linear scale. In other words, no non-linearity function, either logarithm nor root cube is utilized.

Both of these functions provide immunity against wide-band noise and produce coefficients with excellent stability. Moreover, both of the comparison functions strongly simulate the physical limits of basilar membrane.

Human hearing covers a huge range from 0 db to 160 db. We believe, relative excitation mechanism has an important role for nonlinear hearing in such a huge range. Both of the comparison functions strongly simulate incredible human hearing range for different sound pressure levels and sensitivity to very weak signals.

The first comparison function (Eq1) gives coefficients between −0.5 and 0.5. This function cancels out the wide-band noise that covers the comparison distance. When the main and comparison bands have similar noise levels, it is obvious that the coefficients move towards 0 with the increasing noise, which causes the relative excitation range and variance to decrease. Variance normalization on the coefficients of the utterance cancels this effect.

The second comparison function (Eq2) gives coefficients between −1 and 1. This function cancels out the wide-band noise that covers the comparison distance. When noise level increases, the denominator of the function increases, and coefficients move towards 0, which in return decreases the variance of the output. Similar to the first function, variance normalization on the coefficients of the utterance cancels this effect.

The following comparison function (Eq3) is basically the same as Eq1 and gives coefficients between 0 and 1. Since Eq1 inverts the peaks, we used Eq3 for preparing the data of FIG. 11 to visualize the relation between spectrum and Relative Excitation coefficients.

$$Cre = Amb/(Amb + Acb) \quad (Eq3)$$

Computing Wide-Band Energy Coefficients

Relative Excitation Coefficients are absolutely gain-invariant. Some extra coefficients are beneficial to capture the temporal energy properties of speech-production and to compensate the exaggerated effects of noise when there is no signal. Solution is very simple. Logarithm of sum of 2-5 neighboring main band amplitudes are used as a coefficient.

Spectral composition and loudness are two different things also for human auditory perception. For example, when you increase the volume of the music player your perception of the spectral composition doesn't change, but perception of the loudness change.

Generally 4-6 wide band energy coefficients provide good results and the number of the coefficients can be increased if memory and processing load is not a matter.

Differences of wide-band energy coefficients can also be used as features.

Channel-Independence

Different channels (microphones, electronics, compression techniques, etc.) have different frequency responses. Cepstrum method is very weak against these variations. On the contrary, human auditory perception is very strong.

Here are two examples for understanding the channel-independence. First: As a sound signal is propagated from source to receiver, the amplitudes of different frequency components may be attenuated by the environment at different rates. High-frequency components of signals are attenuated by the environment at a higher rate than low-frequency ones. As long as the sound is audible, this phenomenon has almost no effect on intelligibility of the speech. Second: Different frequency responses of different microphones have no or little importance on the intelligibility or our perception of the recorded speech.

Both of the examples are related to robustness against significant deformations of the acoustic spectrum. Generally scientists believe speech-production and auditory perception have a close relation or both of these functions support each other. So there must be a common characteristic of speech production and perception that provides the robustness against spectral deformation. We explain this robustness with close spectral component relations.

Figure 8:
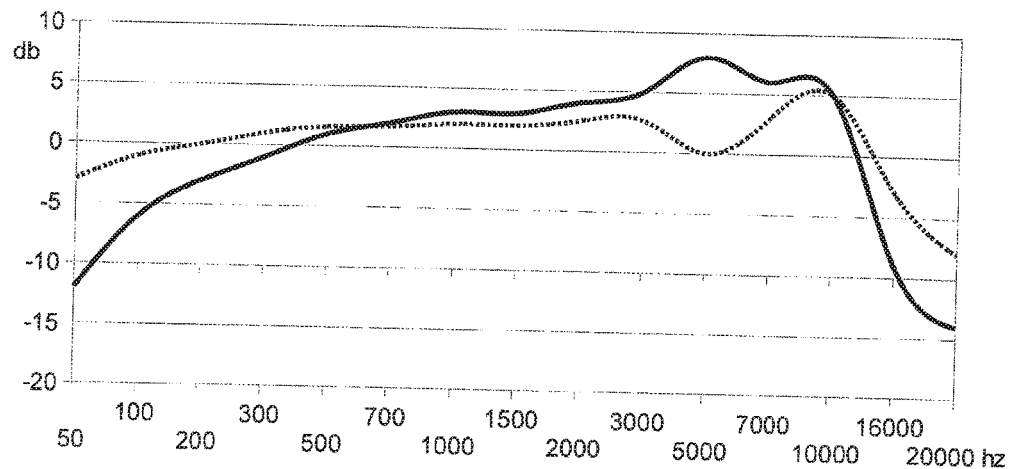
FIG. 8 shows frequency responses of two different high quality microphones to visualize effects of channel variation. Please notice that the deviation between 100 hz and 5 khz is 15 db for one of them while it is close to zero for the other. This deviation can be much larger for low quality microphones. Cepstral coefficients are too sensitive for these deviations in contrast to Relative Excitation coefficients.

Please examine frequency response curves in FIG. 8. The point is that, the frequency response curve of a microphone has similar values for close-frequencies, so the amplitude ratios between close frequency components are preserved, but the amplitude ratios of distant components are distorted significantly. The frequency response deviation between 100 hz and 5 khz is 15 db for one of the microphones (the continuous line of FIG. 8). But the deviation between 200 hz and 300 hz is 2 db for the same microphone.

Figure 5A:
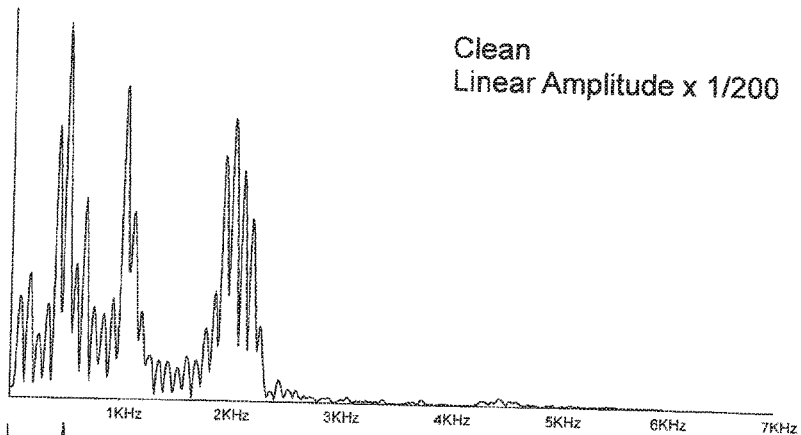
FIG. 5*a* shows spectral amplitudes of a frame selected from a clean utterance.

Now, it is obvious that relations of the close spectral components are preserved while the amplitude relations of distant components are distorted significantly. Let's explain how and why this property is useful. Please check the FIG. 5a. An accustomed eye can easily see the three formants. First one, F1 is around 500 Hz, F2 is close to 1 Khz and F3 is close to 2 Khz. One can find out each formant frequency by checking the neighboring harmonics around the candidate frequency, not the distant ones. So, close spectral component relations have much importance than the distant ones and these relations are strongly preserved. If the amplitude of F3 were halved and F1/F3 amplitude ratio doubled due to the frequency response of the microphone, our perception wouldn't change much, and similar spectral deformations are very common. But it is really difficult for a channel to cause a significant deviation of the ratios of the close harmonic amplitudes (which identify the formant) that results with a change at the formant position. It can be seen that human auditory assigns much more importance to close component relations than the distant component relations for the perception of the spectral composition. We believe this is the most important reason of the human auditory robustness against channel frequency response variation.

Relative Excitation method can easily simulate this property of human auditory perception by utilizing close comparison distances, for example a comparison distance less than 300 Mels.

Figure 11B:
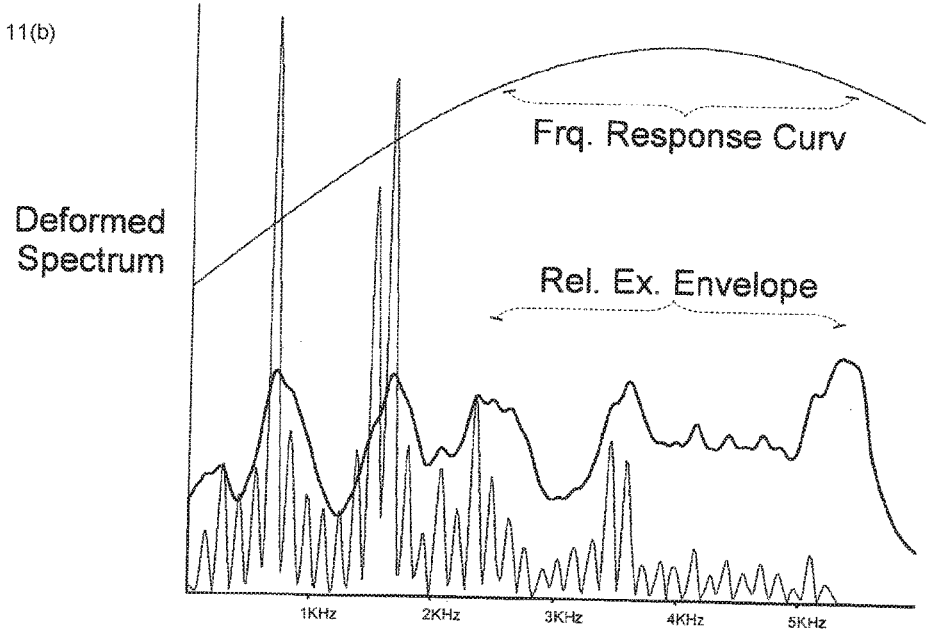
FIG. 11b shows the Relative Excitation envelope estimated from a deformed version of the spectrum drawn on FIG. 11a. Linear frequency response curve of the deformation is also drawn. Please notice that Relative Excitation coefficients remain stable although the spectrum is deformed. The frequency response curve is scaled for better viewing, the minimum coefficient is 0.5 at the left side and the maximum is 2.5 at the top of the sinusoid causing a maximum of 14 db relative deformation for spectral component ratios.

Please check FIG. 11 to see how excellently Relative Excitation method handles the spectral deformations. FIG. 11a shows the original spectrum and its Relative Excitation coefficients. FIG. 11b shows the deformed spectrum, its Relative Excitation coefficients, and the frequency response curve of the deformation. Please notice that Relative Excitation coefficients remain stable although the spectrum is significantly deformed.

In contrast to Relative Excitation, the Cepstrum method fails against channel frequency response variation. As a result when you change the microphone of an MFC based speech recognition system after training, the recognition performance degrades. On the contrary, a speech recognition system based on Relative Excitation features remains robust. Additionally, training an MFC based speech recognition system with audio recorded from different microphones cause coarse acoustic models.

Noise-Immunity

Relative Excitation Features are excellently engineered for noise immunity. Our approach includes some strategies and a very important novel method that will redefine noise robustness.

Some Strategies and Properties Against Noise

Wide band noise is canceled due to the nature of the Relative Excitation coefficient estimation. In addition to this, narrow band noise affects only one coefficient, since each Relative Excitation coefficient is completely independent (in contrast to cepstral coefficients). Since, Cepstrum is the inverse Discrete Fourier Transform (DFT) of the log spectrum, all of the spectral components affect each cepstral coefficient. In other words, some noise in any spectral region affects all of the cepstral coefficients.

Redundancy in speech provides a basis for error correction and resistance to noise for humans (Coker and Umeda 1974). Relative Excitation features preserve redundant information that is useful for noise-immunity. Number of Relative Excitation feature coefficients can be increased to provide better detail and more redundant information to the recognizer. It is possible to increase the number of the Relative Excitation coefficients without "curse of dimensionality". "Curse of dimensionality" is the name of the situation where, as the dimensions of the feature vector are increased, the performance of the system decreases. Increasing number of PLP, MFC and other cepstrum based coefficients causes "Curse of dimensionality".

Relative Excitation method removes the need to find a proper non-linearity function to simulate human hearing like log-compression or root cube. Selecting a non-linearity function to simulate human hearing is a controversial subject. Mainly log-amplitude and cubic-root representations are used. Both of these functions have some drawbacks. Relative Excitation method can directly use the linear amplitude of spectral components.

Figure 7A:
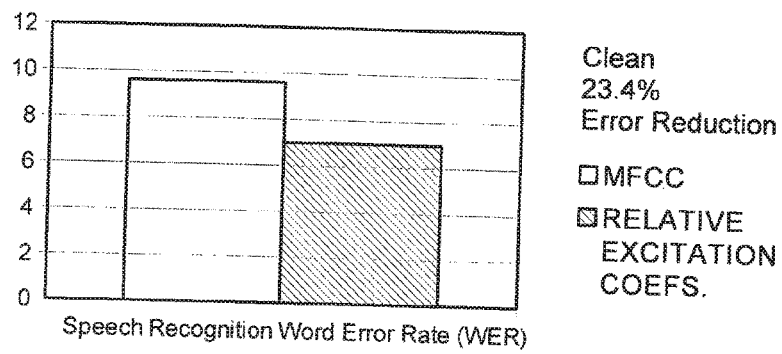
FIG. 7*a* compares WER (Word Error Rate) of Relative Excitation coefficients and MFCC for clean speech (found speech data that may have non disturbing or mild noise). Relative Excitation coefficients provides 23.4% relative error reduction in this test.
Figure 7B:
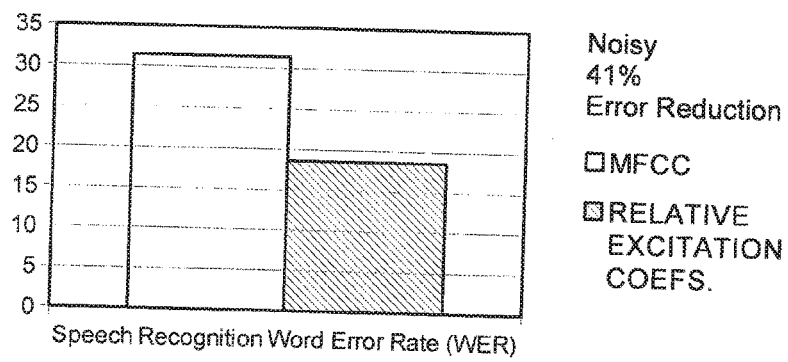
FIG. 7*b* compares WER of Relative Excitation coefficients and MFCC for noisy speech (significant or disturbing crowd, street or office noise). Relative Excitation coefficients provides 41% relative error reduction in this test.
Figure 7C:
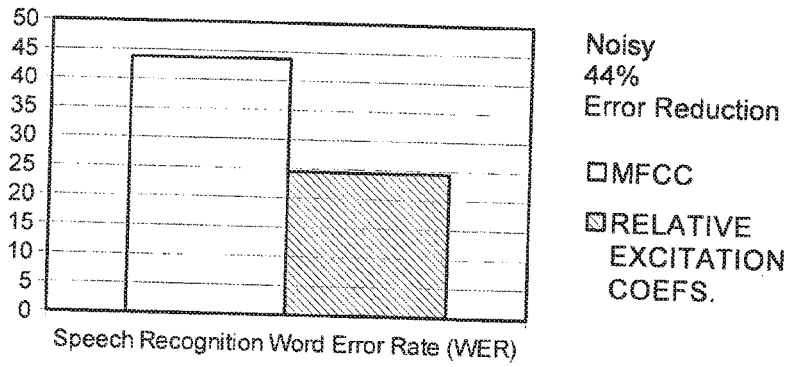
FIG. 7*c* compares WER of Relative Excitation coefficients and MFCC for noisy speech (Artificial white noise added, SNR is about 8-12 db). Relative Excitation coefficients provides 44% relative error reduction in this test.

Moreover, log-compression or root cube non-linearity functions reduce the signal and noise discrimination capability of the system by making signal and noise numerically closer. Please see the FIGS. 7a, 7b and 7c. Noise spectrum and signal spectrum is much more distinguishable in FIG. 7b then FIG. 7c. It is obvious that utilizing the log-spectrum deteriorates robustness against noise. In addition to this, we know that logarithm is not stable for small amplitudes. Despite of these drawbacks, the log-amplitude is inevitable for estimating MFC coefficients.

A Novel Noise Robust Speech Recognition Technique

Figure 5B:
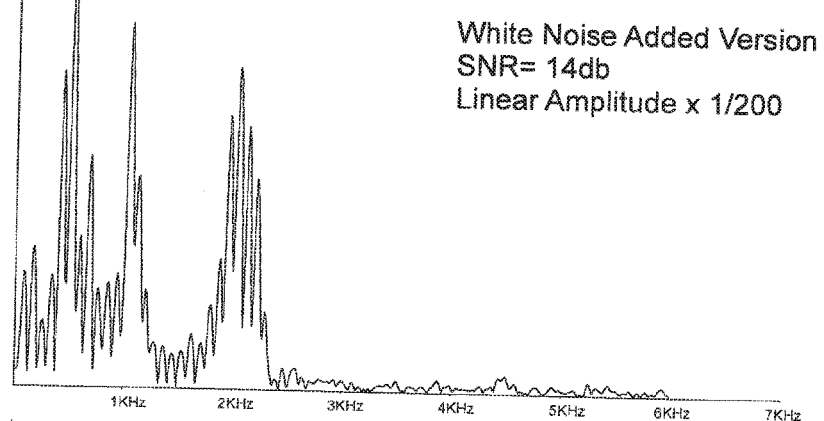
FIG. 5*b* shows spectral amplitudes of the same frame from white noise added version of the same utterance.
Figure 5C:
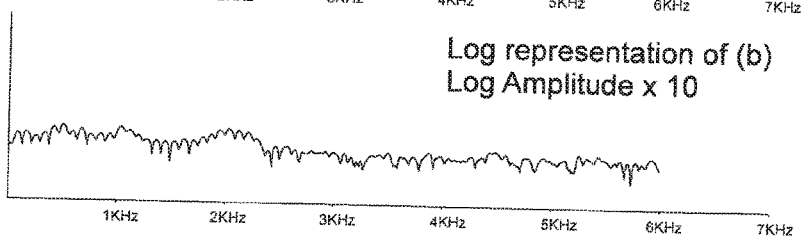
FIG. 5*c* shows logarithmic representation of 5*b*.

The short term speech spectrum almost always has signal and non-signal (or weak-signal) regions depending on the sound being produced or the state of the articulatory organs. Noise becomes the dominant factor for non-signal spectral regions as in FIG. 5b (the region above 3 khz). Cepstrum based methods naturally distribute the effects of the noise to all coefficients that results with coarse acoustic models, because variance of all coefficients are increased.

Figure 6A:
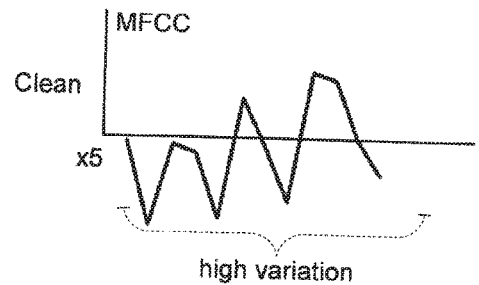
FIG. 6*a* shows MFC coefficients of a vowel sound frame. The amplitude spectrum of this frame is drawn on FIG. 5*a*.
Figure 6B:
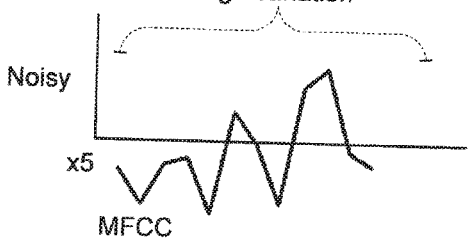
FIG. 6*b* shows MFC coefficients of the noisy version of the sound frame. The amplitude spectrum of this frame is drawn on FIG. 5*b*. Please compare FIGS. 6*a* and 6*b*, and notice high variation of coefficients which shows the weakness of MFCC against noise.
Figure 6C:
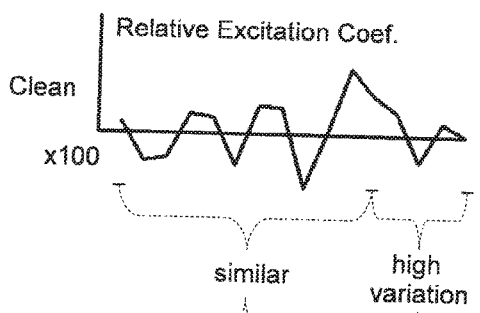
FIG. 6*c* shows Relative Excitation Coefficients of the clean vowel sound frame which's amplitude spectrum is drawn on FIG. 5*a*.
Figure 6D:
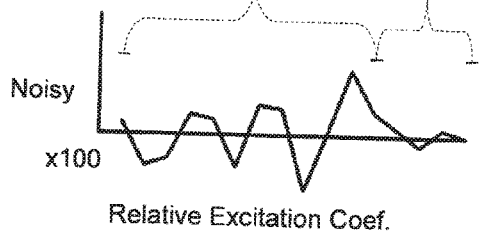
FIG. 6*d* shows Relative Excitation Coefficients of the noisy version of the same sound frame. The amplitude spectrum of this frame is drawn on FIG. 5*b*. Please compare FIGS. 6*c* and 6*d*, and notice the similarity of coefficients that shows the robustness of Relative Excitation coefficients against noise.
Figure 10A:
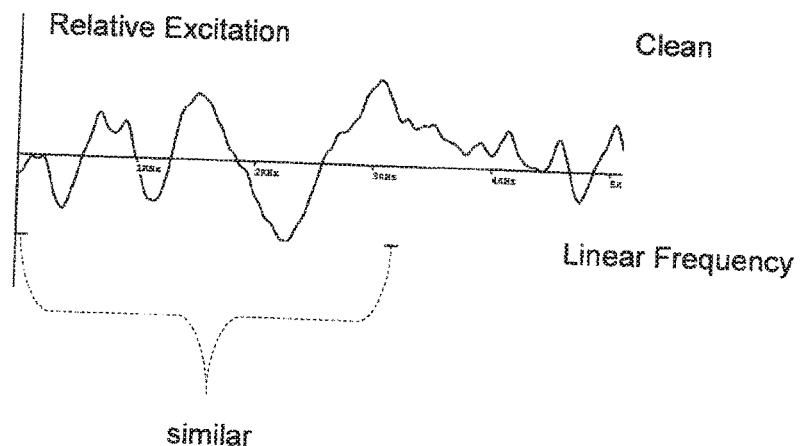
FIG. 10a is the Relative Excitation envelope computed from the frame which's amplitude spectrum is drawn in FIG. 5a. Coefficients are scaled 500 times.
Figure 10B:
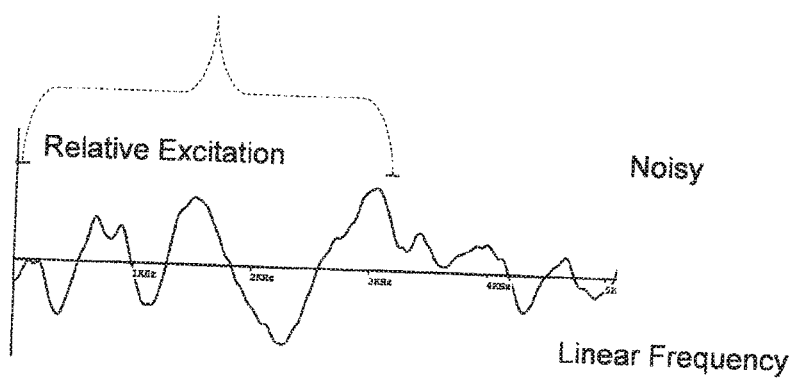
FIG. 10b is the Relative Excitation envelope computed from the frame which's amplitude spectrum is drawn in FIG. 5b. Coefficients are scaled 500 times.

Please check FIG. 6 and notice that all of the MFC coefficients (FIG. 6a-6b) have large deviation in contrast to Relative Excitation coefficients (FIG. 6c-6d). Deviations of the last four Relative Excitation coefficients (11-12-13-14) are high and this is normal (FIG. 6d). Regional gain-invariance properties of relative excitation coefficients exaggerates the effects of the weak noise of non-signal regions (as in FIG. 6d and FIG. 10b). This is true even for high quality speech and this is what we want.

Designing a the Relative Excitation feature extraction system that has a close comparison distance, for example less than 300 Mels, causes a special circumstance which we named frequency-to-coefficient mapping, because each coefficient bear the relationship information of the spectral components located on a definite short spectral segment (between the centers of the compared bands). As an example, in Embodiment 1, each relative excitation coefficient represents approximately a 120 Mels wide spectral segment or frequency band, and a total of 15 coefficients represent the whole spectrum. The term "frequency-to-coefficient mapping" indicates that the parametric representations of spectral segments or frequency bands are directly mapped into coefficients of the acoustic feature vector.

Training statistical acoustic models of context dependent phone states with a frequency-to-coefficient mapping acoustic feature set causes the speech recognition system to learn the signal and non-signal regions of the spectrum. Well trained, close comparison distance Relative Excitation Gaussian Mixture Models have high variance elements for these non-signal noisy regions, since the non-signal region coefficients have high variation due to the infinite diversity of noise, and the speech-signal region coefficients have relatively low variation due to the acoustic limits of the pronunciation of the same sound. Large variance elements of trained models cause these non-signal spectral regions to be neglected during recognition. This resembles the dynamic spectral focusing and ignorance capability of human auditory perception. This technique makes the recognizer to focus on the speech-signal expected regions of the spectrum. Moreover, wide band energy coefficients are compatible with this paradigm to some degree, and adds extra information to the feature vector for identifying the signal and non-signal regions.

The variances of a context dependent vowel (similar to FIG. 6d) HMM triphone state is copied below. The Gaussian mixture model is trained with relative excitation feature vectors having scaled coefficients of Eq-2. Please notice the variance of the last 4 elements which are in the non-signal region of the context dependent vowel spectrum.

$V01=107$ $V02=108$ $V03=113$ $V04=159$ $V05=184$ $V06=140$ $V07=096$ $V08=111$ $V09=142$ $V10=179$ $V11=264$ $V12=463$ $V13=491$ $V14=558$ $V15=565$

For many years, scientists have been trying to cancel noise or its effects. These efforts have reached a limited success because of the diversity of the noise. For the first time, with this invention, a solution has emerged which has capability to ignore any kind of noise (to some degree) for speech recognition systems.

It is obvious that this technique doesn't provide benefit for the noise of spectral regions that are expected to have the speech signal. But, generally speech recognition systems use close talking microphones that make the speech signal much stronger than the noise, because intensity of sound is inversely proportional to the square of the distance. As a result, we can accept that the signal components of the speech spectrum will be generally stronger than the noise for speech recognition systems. For the signal regions of the spectrum, if the amplitude of the noise is lower than the amplitude of the signal, Relative Excitation method excellently estimates robust coefficients that are not very different from the clean version of the same signal. As long as the frequency component of the signal is stronger than the noise, Relative Excitation Method is very powerful for computing the accurate coefficients. This feature also resembles the robustness of human auditory perception.

Cepstrum method gives equal opportunity to any region of the spectrum for affecting all of the coefficients. This is one of the most important reasons of the failure of Cepstrum technique against noise.

We can summarize our novel approach for noise robust speech recognition with the following steps:

1. In the training phase, extract features that are based on the short term spectrum of the acoustic signal in a way that each coefficient or element of the feature vector represents only a definite region or segment of the spectrum, so noisy spectral components or regions affect only the corresponding coefficients. We named this technique as frequency-to-coefficient mapping feature extraction.
2. Train the acoustic models of the speech recognizer with the features extracted in the first step. Ordinary Gaussian mixture models can be utilized. Preferably context dependent phone models should be used. The variances of the acoustic feature vector elements must be estimated. The non-signal (or weak-signal) and noise dominated spectral region coefficients will have high variance or deviation due to the infinite diversity of noise, in contrast, the speech-signal region coefficients will have relatively low variance or deviation due to the acoustic limits of the pronunciation of the same sound. As a result, the speech signal expected regions of the spectrum are automatically learned.
3. In the recognition phase, use the feature extraction technique of the step 1 to compute the acoustic observation vectors. Utilize an acoustic observation probability or likelihood estimator that accounts for the variance, such as Gaussian mixture models. Since the observation probability estimator inversely weights the distance (difference from the expected value) by the variance, significance of a feature vector element in the resulting probability decreases with the increasing variance. In other words, the high-variance coefficients that represent the noise dominant or non-signal regions of the spectrum have less weight in resulting probability or distance. As a result, just like humans, the recognizer focuses on signal expected regions of the spectrum while noise-dominant regions are ignored.

Figure 9:
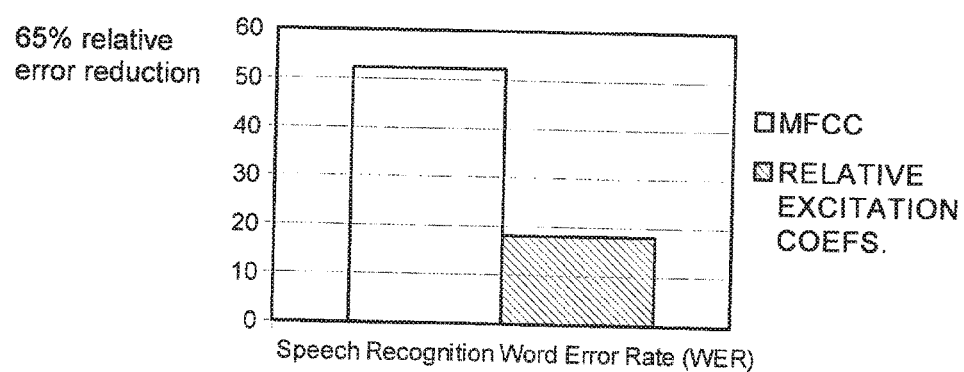
FIG. 9 shows comparison of MFC and Relative Excitation coefficients for training with noisy speech. Healthy training with noisy speech is important especially for using found speech data to train a speech recognition system. Embodiment 1 is used for calculating Relative Excitation coefficients in this test.

To show the effectiveness of this method and other noise robust properties of Relative Excitation method, we made a comparison test. MFC and Relative Excitation based speech recognition systems are trained with noisy audio for this test. As expected, some limited noise in the training audio deteriorates the MFC HMM while the Relative Excitation HMM remains robust. Please see the FIG. 9. Both of the systems are trained with the same audio corpus. Constant level of white noise is injected into all utterances before training. Test utterances are clean. In this test Relative Excitation method achieves 65% error reduction compared to MFC. This result is important especially for the speech recognition systems that are trained with found acoustic data.

Dynamic Spectral Range

Many speech recognition systems analyze frequencies up to 7 Khz and need wideband audio. But wideband audio is not always available. Such as a call recording received from PSTN with a frequency range of 300-3300 Hz. Please think about a television broadcast having a speaker in the studio and a remote speaker connected over PSTN. In this case wideband and narrowband audio will be in the same recording or in the same channel. Cepstrum based feature extraction method and acoustic models can't handle this issue.

If a cepstrum based system is configured and trained for narrowband audio, it is possible to use the system for both audio types but the extra intelligibility provided by wideband audio will be lost, because significant amount of consonants' energy remains beyond the 3.3 kHz cutoff level of the PSTN standard.

If a cepstrum based system is configured and trained for wideband audio, the system will fail to recognize narrowband audio, since blank regions of the spectrum will affect of all the cepstral coefficients.

Frequency-to-coefficient mapping Relative Excitation coefficients provide the best possible solution. We can summarize this novel technique with the following steps:

1. Configure a Relative Excitation based speech recognizer for wideband audio and and train it with wideband audio.
2. When a new utterance is received for recognition check the upper and lower limits of the spectrum.
3. Adjust the acoustic probability or likelihood estimator function to utilize only the elements of the acoustic feature vector that are settled in the spectral range of the acoustic observation signal. So that blank regions of the spectrum are excluded from the acoustic probability estimation.

The correspondence of the feature vector elements to the frequency bands or spectral regions and the independence of the feature vector elements make this solution possible.

Description of Embodiment 1

Framing: 16 khz PCM digital audio is divided into 25 ms frames with a 8.75 ms shift. Each frame is multiplied by a hamming window.

Conversion to frequency domain: A 1024 point FFT resulting with 512 frequency bins is used. Each bin frequency is converted to mel-scale with the following pseudocode.

```
for BinNo=0 to 511 do
Mel[BinNo]= 2595 * log10(1 + (BinNo*(SamplingFrq/1024)) / 700 );
```

Main Bands: 15 main bands are used. Main bands are evenly distributed on the Mel-Frequency scale. Each main band has 160 Mels distance to the next. The first band's center frequency is 290 Mel (205 hz). The last band's center frequency is 2530 Mel (5907 Hz). The width of the main band sinusoidal filters is 320 Mels (the bandwidth measured between zero points of the sinusoidal filter frequency response). This means actual sinusoidal filter width on the linear scale depends on the center frequency of the main band. Each main band has it's own sinusoidal filter. Here is the pseudocode for calculating main band centers and sinusoidal filter coefficients:

```
for BandNo=0 to 14 do
begin
  MainBand[BandNo].Center= 290 + 160*BandNo;
  CoeffCnt= 0;
  leftCoeffCnt= 0;
  RightCoeffCnt= 0;
  for BinNo= 0 to 511 do
  begin
    if (Mel[BinNo] >= MainBand[BandNo].Center-160) and
       (Mel[BinNo] < MainBand[BandNo].Center) then
    begin
      MainBand[BandNo].Bins[CoeffCnt]= BinNo;
      inc(CoeffCnt);
      inc(leftCoeffCnt);
    end;
    if (Mel[BinNo] >= MainBand[BandNo].Center) and
       (Mel[BinNo] < (MainBand[BandNo].Center+160)) then
    begin
      MainBand[BandNo].Bins[CoeffCnt]= BinNo;
      inc(CoeffCnt);
      inc(RightCoeffCnt);
    end;
  end;
  MainBand[BandNo].CoeffCnt= CoeffCnt;
```

```
    for CoefNo=0 to leftCoeffCnt-1 do
        MainBand[BandNo].FilterCoeff[CoefNo] = sin( pi*CoefNo/(leftCoeffCnt*2));
    for CoefNo=0 to RightCoeffCnt-1 do
        MainBand[BandNo].FilterCoeff[leftCoeffCnt+CoefNo]=
            sin(pi/2 - pi*CoefNo/(RightCoeffCnt*2));
end;
```

Here is pseudocode for calculating main band amplitudes.

```
for BandNo=0 to 14 do
begin
    MainBandAmp[BandNo]= 0;
    SumCoeff=0;
    for CoeffNo=0 to MainBand[BandNo].CoeffCnt-1 do
    begin
        MainBandAmp[BandNo]= MainBandAmp[BandNo] +
            MainBand[BandNo].FilterCoeff[CoefNo] *
            spectrum[ MainBand[BandNo].Bins[CoeffNo] ];
        SumCoeff= SumCoeff + MainBand[BandNo].FilterCoeff[CoefNo];
    end;
    MainBandAmp[BandNo]= MainBandAmp[BandNo]/SumCoeff;
end;
```

"spectrum[ ]" is the FFT amplitude spectrum for the windowed frame.

Comparison Bands: One comparison band is used for each main band. Each comparison band has a center frequency that is 120 Mels higher than its main band center. The width of a comparison band sinusoidal filter is 360 Mels (the bandwidth measured between zero points of the sinusoidal filter frequency response). Actual sinusoidal filter width on the linear scale depends on the center frequency of the comparison band. Each comparison band has its own sinusoidal filter. Here is the pseudocode for calculating comparison band centers and sinusoidal filter coefficients.

```
for BandNo=0 to 14 do
begin
    ComparisonBand[BandNo].Center= MainBand[BandNo].Center + 120;
    CoeffCnt= 0;
    leftCoeffCnt= 0;
    RightCoeffCnt= 0;
    for BinNo= 0 to 511 do
    begin
        if (Mel[BinNo] >= ComparisonBand[BandNo].Center-180) and
            (Mel[BinNo] < ComparisonBand[BandNo].Center) then
        begin
            ComparisonBand[BandNo].Bins[CoeffCnt]= BinNo;
            inc(CoeffCnt);
            inc(leftCoeffCnt);
        end;
        if (Mel[BinNo] >= ComparisonBand[BandNo].Center) and
            (Mel[BinNo] < (ComparisonBand[BandNo].Center+180)) then
        begin
            ComparisonBand[BandNo].Bins[CoeffCnt]= BinNo;
            inc(CoeffCnt);
            inc(RightCoeffCnt);
        end;
    end;
    ComparisonBand[BandNo].CoeffCnt= CoeffCnt;
    for CoefNo=0 to leftCoeffCnt-1 do
        ComparisonBand[BandNo].FilterCoeff[CoefNo] =
            sin( pi*CoefNo/(leftCoeffCnt*2));
    for CoefNo=0 to RightCoeffCnt-1 do
        ComparisonBand[BandNo].FilterCoeff[leftCoeffCnt+CoefNo]=
            sin(pi/2 - pi*CoefNo/(RightCoeffCnt*2));
end;
```

Here is the pseudocode for calculating comparison band amplitudes:

```
for BandNo=0 to 14 do
begin
    ComparisonBandAmp[BandNo]= 0;
    SumCoeff= 0;
    for CoeffNo= 0 to ComparisonBand[BandNo].CoeffCnt-1 do
    begin
        ComparisonBandAmp[BandNo]= ComparisonBandAmp[BandNo] +
            ComparisonBand[BandNo].FilterCoeff[CoeffNo] *
            spectrum[ ComparisonBand[BandNo].Bins[CoeffNo] ];
        SumCoeff= SumCoeff + ComparisonBand[BandNo].FilterCoeff
            [CoeffNo];
    end;
    ComparisonBandAmp[BandNo]= ComparisonBandAmp[BandNo]/
        SumCoeff;
end;
```

Relative Excitation Coefficients: 15 relative excitation coefficients are calculated with the Eq-2. Here is the pseudocode for calculating the relative excitation coefficients:

```
for BandNo=0 to 14 do
begin
    RelexCoeff[BandNo]=(MainBandAmp[BankNo] -
    ComparisonBandAmp[BandNo]) /
        (MainBandAmp[BandNo] + ComparisonBandAmp[BandNo]) ;
end;
```

Wide-Band Energy Coefficients: 5 wide-band energy coefficients are computed. Each coefficient is calculated from 3 neighboring main band amplitudes:

```
for WideBandNo=0 to 4 do
begin
    WdBndEngCoeff[WideBandNo]= ln(MainBandAmp[WideBandNo*3] +
        MainBandAmp[WideBandNo*3+1] +
        MainBandAmp[WideBandNo*3+2] ) ;
end;
```

Relative Excitation Coefficients and Wide-Band Energy Coefficients are combined on a 20 dimensional single vector. For each frame, delta and acceleration coefficients are added to form a 60-dimensional acoustic feature vector. Mean and variance normalization is applied to each frame of the utterance.

Description of Embodiment 2

In this embodiment bins of an FFT transform are used as spectral components. Although Embodiment 2 and Embodiment 1 seems to be different, they are very similar. Both of the Embodiments simulate relative excitation levels of different neuron groups. In Embodiment 2 comparison results are integrated instead of integrating the bin amplitudes located in a frequency band prior to comparison as in Embodiment 1. The method explained in this embodiment can also be used for narrow spectral component's instead of frequency bins. Embodiment 2 provides similar accuracy compared to Embodiment-1 with the capability to control the weight of each frequency bin or the weight of a comparison in the resulting coefficient, but requires more computation. Having the capability to control the weight of each frequency bin or comparison provides extensive possibilities for processing the signal in the frequency domain.

Frame blocking and frequency domain conversion is the same with Embodiment-1. Then, these steps are applied:
1—Estimate wide band energy coefficients.
2—Estimate relative excitation spectrum.
3—Estimate relative excitation envelope.
4—Estimate relative excitation coefficients by resampling the relative excitation envelope.

Estimating wide band energy coefficients is the same as in Embodiment-1.

Estimating relative excitation spectrum comprises novel techniques which are very powerful and very interesting.

Amplitude of each bin is compared with following bins that are placed in a certain spectral range. Each comparison produces a coefficient that is weighted according to it's distance and compared bin's amplitude. Sum of weighted coefficients of a bin is normalized by sum of weights to form a bin of the relative excitation spectrum.

Weighting according to compared bin's distance is applied because we want distant comparisons have less weight and try to limit the comparison in a certain band that simulates a neuron group on tonotopic mapping.

Weighting according to compared bin's amplitude is applied to increase the weight of comparison coefficients of high amplitude bins. Because we know resonance points on basilar membrane forms actual stimulation, and in addition to this, low amplitude bins generally represent noise.

Weighting according to compared bin's amplitude is optional. This technique provides extra robustness against wide-band noise like white noise or crowd noise but causes extra sensitivity for noises having sharp peaks in the spectrum such as resonance point of a musical instrument's sound. In our tests, amplitude weighting for a specific bin is extended to include bin amplitudes of possible a few harmonic frequencies and better results against noise are achieved.

Eq-1 is utilized in this embodiment and relative excitation spectrum is estimated with following pseudocode:

```
for BinNo=0 to BinCount-9 do
begin
   CompLen = 20 + BinNo div 8;
   Last = BinNo + CompLen;
   if Last>BinCount-1 then Last=BinCount-1;
   TotalK= 0;
   ExcitationSpect[BinNo]=0;
   for I= BinNo to Last do
   begin
      K = spectrum[I] * (1- (I-BinNo) / CompLen);
      ExcitationSpect[BinNo]= ExcitationSpect[BinNo] +
         K * spectrum[BinNo]/(spectrum[BinNo]+spectrum[I]);
      TotalK= TotalK+K;
   end;
   ExcitationSpect[BinNo]= ExcitationSpect[BinNo]/TotalK;
end;
```

The "CompLen=20+BinNo div 8;" line is for calculating the range of comparison and simply simulates constant bandwidth in logarithmic scale that increases in linear scale. This comparison range equals 312 hz at 200 hz and 812 hz and 4 Khz.

The "K=spectrum[I]*(1−(I−BinNo)/CompLen)" function is used for smoothly tapering the affect of distant bins and weighting according to amplitude of compared bin. "spectrum[I]" is the amplitude of the compared bin and this value can be extended to have the amplitudes of a few possible harmonics of the compared bin as "(spectrum[I]+spectrum[PossibleHarmonic1]+spectrum[PossibleHarmonic2])"

As an alternative for bin-to-bin comparison, amplitude of each bin or spectral component can directly be compared to the amplitude of a comparison band instead of the bins or the spectral components located in the comparison band that can be named as bin-to-band comparison.

Estimating relative excitation envelope is simple. Each bin of relative excitation spectrum is recalculated utilizing amplitudes of neighboring bins in a certain range. This range should be adjusted to cover at least one harmonic of high pitched human speech.

```
for BinNo=0 to BinCount-1 do
begin
   First = BinNo - 16;
   Last = BinNo + 16;
   if First<1 then First= 1;
   if Last>BinCount-1 then Last=BinCount-1;
   TotalK= 0;
   ExcEnvelope[BinNo]=0;
   for I=first to Last do
   begin
      K = spectrum[I] * power(0.8, abs(I-BinNo)) ;
      ExcEnvelope[BinNo]= ExcEnvelope[BinNo] + K * ExcitationSpect[I];
      TotalK= TotalK+K;
   end;
   ExcEnvelope[BinNo]= ExcEnvelope[BinNo]/TotalK;
end;
```

"K=spectrum[I]*power(0.8, abs(I−BinNo))" is for estimating a weight coefficient that depends on the distance and the amplitude of the weighted bin. Main band sinusoidal filters are directly used on the relative excitation envelope to calculate relative excitation coefficients. Here is the pseudocode:

```
for BandNo=0 to 14 do
begin
   RelexCoeff[BandNo]= 0;
   SumCoeff=0;
   for CoeffNo=0 to MainBand[BandNo].CoeffCnt-1 do
   begin
      RelexCoeff[BandNo]= RelexCoeff[BandNo] +
         MainBand[BandNo].FilterCoeff[CoeffNo] *
         ExcEnvelope[ MainBand[BandNo].Bins[CoeffNo] ];
      SumCoeff= SumCoeff + MainBand[BandNo].FilterCoeff[CoeffNo];
   end;
   RelexCoeff[BandNo]= RelexCoeff[BandNo]/SumCoeff;
end;
```

Relative excitation coefficients and wide-band energy coefficients are combined on a 20 dimensional single vector. For each frame, delta and acceleration coefficients are added to form a 60-dimensional acoustic feature vector. Mean and variance normalization is applied to each frame of the utterance.

The invention claimed is:

1. A method for computer acoustic recognition, the method comprising:

estimating, using a processor, amplitudes of frequency bands of a spectrum of a received acoustic signal;

computing, using a function of an amplitude comparator, coefficients as acoustic features of the frequency bands, wherein:

the coefficients are quantitative measures of a relationship between amplitudes of frequency bands compared by the comparator;

center values of compared frequency bands are separated by a distance less than 800 units on the Mel-frequency scale or less than an equivalent distance on a scale other than the Mel-frequency scale;

a 3 dB bandwidth of the frequency bands range between 120 and 240 Mels on the Mel-frequency scale or an equivalent range on another scale;

the 3 dB bandwidth is one of measured at half-power points, or is the points where the gain is −3 dB, or 0.707 relative to peak;

using the estimated coefficients as acoustic features in a computer acoustic recognition system; and performing recognition of an audible signal using the computer acoustic recognition system.

2. The method as defined in claim 1, wherein the center values of compared frequency bands are separated by a distance less than 300 units on the Mel-frequency scale or an equivalent range on another scale.

3. The method as defined in claim 1, further comprising combining the estimated coefficients with wide band energy coefficients or their differences to obtain an acoustic feature vector, wherein a said wide-band energy coefficient is defined as a coefficient that represents a logarithmic amplitude of a said frequency band.

4. The method as defined in claim 1, wherein the coefficients are computed by utilizing a predetermined uniform comparison structure that is one of (a) not dependent on the acoustic signal, or (b) used for any acoustic signal.

5. The method as defined in claim 1, further comprising:
comparing two frequency bands,
wherein the function of the amplitude comparator is one of the ratio of the difference of compared frequency band amplitudes to the sum of both, or the ratio of one of the compared frequency band amplitudes to the sum of both.

6. The method of claim 1, wherein the coefficients extracted as acoustic features are used in the computer acoustic recognition system for one of sound recognition or training of acoustic models.

7. The method of claim 1, further comprising using the coefficients extracted as acoustic features for understanding and simulating human auditory perception.

8. A method for computer acoustic recognition, comprising:

estimating, using a processor, amplitudes of frequency bands of a spectrum of a received acoustic signal;

computing, using a function of an amplitude comparator, first coefficients as acoustic features of the frequency bands, wherein:

the first coefficients are quantitative measures of the relationship between amplitudes of frequency bands compared by the comparator;

center values of compared frequency bands are separated by a distance less than 800 units on the Mel-frequency scale or less than an equivalent distance on a scale other than the Mel-frequency scale;

a 3 dB bandwidth of the compared frequency bands is shorter than 120 Mels on the Mel-frequency scale or an equivalent range on another scale;

the 3 dB bandwidth is one of measured at half-power points, or is the points where the gain is −3 dB, or 0.707 relative to peak;

integrating, using an integrator, the results of the amplitude comparator to obtain second coefficients, wherein the second coefficients are quantitative measures of the relationship between amplitudes of frequency bands of the spectrum of the received acoustic signal, each frequency band having a 3 dB bandwidth ranging between 120 and 240 Mels on the Mel-frequency scale or an equivalent range on another scale;

using the obtained second coefficients as acoustic features in a computer acoustic recognition system; and performing acoustic recognition using the computer acoustic recognition system.

9. The method as defined in claim 8, wherein the center value of respective frequency bands of compared frequency bands are separated by a distance less than 300 units on the Mel-frequency scale or an equivalent range on another scale.

10. The method as defined in claim 8, further comprising adding wide band energy coefficients or their differences to an acoustic feature vector, wherein a said wide-band energy coefficient is defined as a coefficient that represents a logarithmic amplitude of a said frequency band.

11. The method as defined in claim 8, wherein the coefficients are computed by utilizing a predetermined uniform comparison structure that is one of (a) not dependent on the acoustic signal, or (b) used for any acoustic signal.

12. The method of claim 8, wherein the coefficients are used in the computer acoustic recognition system for one of sound recognition or training of acoustic models.

13. The method of claim 8, further comprising using the coefficients for understanding and simulating human auditory perception.

14. A method for computer acoustic recognition, the method comprising:

estimating, using a processor, bin amplitudes of a frequency transform function of a received acoustic signal; and computing, using a function of an amplitude comparator, coefficients which are quantitative measures of the relationship between the bin amplitudes that are compared, the computing comprising, for each of a plurality of bins:

comparing the bin amplitude to the respective amplitude of each of a plurality of different bins that are placed in a predetermined spectral range or frequency band;

integrating the results of the comparisons made for the bin with a plurality of bins that lie in a band to form a coefficient specific to the compared bin;

the computing further comprising integrating coefficients of neighboring bins that are placed in a certain frequency band to form an acoustic feature coefficient;

using the acoustic feature coefficients as acoustic features in a computer acoustic recognition system; and performing acoustic recognition using the computer acoustic recognition system.

15. The method as defined in claim 14, wherein the acoustic feature coefficients are quantitative measure of a relationship between amplitudes of frequency bands of a spectrum of the received acoustic signal, each frequency band having a 3 dB bandwidth ranging between 120 and 240 Mels on the Mel-frequency scale or an equivalent range on another scale.

16. The method as defined in claim 14, further comprising weighting of the comparison results.

17. The method as defined in claim 16, wherein the weighting is performed according to one of the amplitude, the distance of the compared bins, or amplitudes of harmonics of the compared bins.

18. The method as defined in claim 14, further comprising:
avoiding long distance spectral component comparisons; and
selecting the compared bins to be in the same spectral region which has a bandwidth less than 400 Mels or less than equivalent in another scale.

19. The method of claim 14, wherein the acoustic feature coefficients are used in the computer acoustic recognition system.

20. The method of claim 14, further comprising using the acoustic feature coefficients for understanding and simulating human auditory perception.

21. A method for computer acoustic recognition, the method comprising:
estimating, using a processor, bin amplitudes of a frequency transform function of a received acoustic signal; and
computing, using a function of an amplitude comparator, coefficients which are quantitative measures of the relationship between the bin amplitudes that are compared, the computing comprising, for each of a plurality of bins:
comparing the bin amplitude to the respective amplitude of at least one frequency band that is placed in a predetermined spectral range;
the computing further comprising integrating coefficients of neighboring bins that are placed in a certain frequency band to form an acoustic feature coefficient;
using the acoustic feature coefficients as acoustic features in a computer acoustic recognition system; and
performing acoustic recognition using the computer acoustic recognition system.

22. The method as defined in claim 21, wherein the acoustic feature coefficients are quantitative measure of a relationship between amplitudes of frequency bands of a spectrum of the received acoustic signal, each frequency band having a 3 dB bandwidth ranging between 120 and 240 Mels on the Mel-frequency scale or an equivalent range on another scale.

23. The method as defined in claim 21, further comprising weighting of the comparison results.

24. The method as defined in claim 23, wherein the weighting is performed according to one or more of the amplitude of the compared bin, the amplitude of the frequency band to which the bin is compared, the distance between the compared bin and frequency band, amplitudes of harmonics of the compared bin and amplitudes of harmonics of the frequency band to which the bin is compared.

25. The method as defined in claim 21, further comprising:
avoiding long distance spectral component comparisons; and
selecting the compared bin and frequency band to be in the same spectral region which has a bandwidth less than 400 Mels or less than equivalent in another scale.

26. The method of claim 21, wherein the acoustic feature coefficients are used in the computer acoustic recognition system.

27. The method of claim 21, further comprising using the acoustic feature coefficients for understanding and simulating human auditory perception.

28. A system for computer acoustic recognition, the system comprising:
a processor configured to estimate amplitudes of frequency bands of a spectrum of a received acoustic signal;
an amplitude comparator configured to compute, using a function, coefficients as acoustic features of the frequency bands, wherein:
the coefficients are quantitative measures of a relationship between amplitudes of frequency bands compared by the comparator;
center values of compared frequency bands are separated by a distance less than 800 units on the Mel-frequency scale or less than an equivalent distance on a scale other than the Mel-frequency scale;
a 3 dB bandwidth of the frequency bands range between 120 and 240 Mels on the Mel-frequency scale or an equivalent range on another scale;
the 3 dB bandwidth is one of measured at half-power points, or is the points where the gain is −3 dB, or 0.707 relative to peak;
the estimated coefficients are used as acoustic features in a computer acoustic recognition system; and
recognition of an audible signal is performed using the computer acoustic recognition system.

29. A system for computer acoustic recognition, the system comprising:
a processor configured to estimate amplitudes of frequency bands of a spectrum of a received acoustic signal;
an amplitude comparator configured to compute, using a function, first coefficients as acoustic features of the frequency bands, wherein:
the first coefficients are quantitative measures of the relationship between amplitudes of frequency bands compared by the comparator;
center values of compared frequency bands are separated by a distance less than 800 units on the Mel-frequency scale or less than an equivalent distance on a scale other than the Mel-frequency scale;
a 3 dB bandwidth of the compared frequency bands is shorter than 120 Mels on the Mel-frequency scale or an equivalent range on another scale;
the 3 dB bandwidth is one of measured at half-power points, or is the points where the gain is −3 dB, or 0.707 relative to peak; and
an integrator configured to integrate the results of the amplitude comparator to obtain second coefficients, wherein:
the second coefficients are quantitative measures of the relationship between amplitudes of frequency bands of the spectrum of the received acoustic signal, each frequency band having a 3 dB bandwidth ranging between 120 and 240 Mels on the Mel-frequency scale or an equivalent range on another scale;
the obtained second coefficients are used as acoustic features in a computer acoustic recognition system; and
acoustic recognition is performed using the computer acoustic recognition system.

30. A system for computer acoustic recognition, the system comprising:
a processor configured to estimate bin amplitudes of a frequency transform function of a received acoustic signal; and
an amplitude comparator configured to compute, using a function, coefficients which are quantitative measures of the relationship between the bin amplitudes that are compared, the computing comprising, for each of a plurality of bins:

comparing the bin amplitude to the respective amplitude of each of a plurality of different bins that are placed in a predetermined spectral range or frequency band;

integrating the results of the comparisons made for the bin with a plurality of bins that lie in a band to form a coefficient specific to the compared bin; and integrating coefficients of neighboring bins that are placed in a certain frequency band to form an acoustic feature coefficient;

wherein the acoustic feature coefficients are used as acoustic features in a computer acoustic recognition system, and wherein acoustic recognition is performed using the computer acoustic recognition system.

31. A system for computer acoustic recognition, the system comprising:

a processor configured to estimate bin amplitudes of a frequency transform function of a received acoustic signal; and an amplitude comparator configured to compute, using a function, coefficients which are quantitative measures of the relationship between the bin amplitudes that are compared, the computing comprising, for each of a plurality of bins:

comparing the bin amplitude to the respective amplitude of at least one frequency band that is placed in a predetermined spectral range; and integrating coefficients of neighboring bins that are placed in a certain frequency band to form an acoustic feature coefficient;

wherein the acoustic feature coefficients are used as acoustic features in a computer acoustic recognition system, and wherein acoustic recognition is performed using the computer acoustic recognition system.

* * * * *